(12) United States Patent
Morand

(10) Patent No.: US 11,722,551 B2
(45) Date of Patent: Aug. 8, 2023

(54) OPTIMIZATION OF FILES COMPRESSION

(71) Applicant: Schneider Electric Industries SAS, Rueil Malmaison (FR)

(72) Inventor: Denis Morand, Chateauneuf-Villevieille (FR)

(73) Assignee: Schneider Electric Industries SAS, Rueil Malmaison (FR)

(*) Notice: Subject to any disclaimer, the term of this patent is extended or adjusted under 35 U.S.C. 154(b) by 29 days.

(21) Appl. No.: 17/395,530

(22) Filed: Aug. 6, 2021

(65) Prior Publication Data

US 2022/0053046 A1 Feb. 17, 2022

(30) Foreign Application Priority Data

Aug. 11, 2020 (EP) ..................................... 20305923

(51) Int. Cl.
*H04L 67/06* (2022.01)
*G06F 16/182* (2019.01)
*G06F 16/174* (2019.01)
*G06F 9/48* (2006.01)
*G06F 9/54* (2006.01)

(52) U.S. Cl.
CPC ............ *H04L 67/06* (2013.01); *G06F 9/4881* (2013.01); *G06F 9/54* (2013.01); *G06F 16/1744* (2019.01); *G06F 16/183* (2019.01)

(58) Field of Classification Search
CPC ........ G06F 9/4881; G06N 5/025; G06N 3/08; H04L 67/12; H04L 69/04; H04W 4/368
See application file for complete search history.

(56) References Cited

U.S. PATENT DOCUMENTS 9,342,786 B2* 5/2016 Krause .................... G06N 5/04
2020/0226107 A1* 7/2020 Dixit .................. G06F 16/1752
2020/0322703 A1* 10/2020 Bures ..................... G06N 20/00

FOREIGN PATENT DOCUMENTS

CN 106716938 B * 6/2020 ........... H04L 43/062

OTHER PUBLICATIONS

Pase, F., Gunduz, D., & Zorzi, M. (2021). Contextual Multi-Armed Bandit with Communication Constraints whole document, https://openreview.net/forum?id=-spj8FZD4y2., retrieved from inter net Nov. 30, 2022 (Year: 2021).*

(Continued)

*Primary Examiner* — Tom Y Chang
(74) *Attorney, Agent, or Firm* — Locke Lord LLP

(57) ABSTRACT

A device for optimizing the scheduling of files to be sent to an application server at regular time intervals, the device configured to:
retrieve a first set of files from a database for a time interval, the first set of files being stored in a priority queue and carrying information sent from sensors linked to industrial machines,
apply the retrieved first set of files to a scheduling algorithm using a compression ratio and combined with a reinforcement learning in order to select a second set of files,
compress the second set of files based on the compression ratio into a compressed file, wherein the size of the compressed file is below a size limit, and
send the compressed file to the application server,
wherein the compression ratio is updated based on the size of the second set of files and the size of the compressed file, and
wherein the reinforcement learning uses the size of a previous compressed file from a previous time interval.

11 Claims, 2 Drawing Sheets

(56) References Cited

OTHER PUBLICATIONS

Xia, W., Quek, T. Q., Guo, K., Wen, W., Yang, H. H., &Zhu, H. (2020). Multi-armed bandit-based client scheduling for federated learning. IEEE Transactions on Wireless Communications, 19(11), 7108-7123. , https://ieeexplore.ieee.org/abstract/document/9142401, retrieved from inernet Nov. 30, 2022 (Year: 2020).*

Yu, Xinyang et al., "Two-Level Data Compression using Machine Learning in Time Series Database", 2020 IEEE 36th International Conference on Data Engineering (ICDE), IEEE Computer Society, Apr. 20, 2020, pp. 1333-1344.

Sekine, Masatoshi et al., "LACSLE: Lightweight and Adaptive Compressed Sensing Based on Deep Learning for Edge Devices", 2019 IEEE Global Communications Conference (GLOBECOM), IEEE, Dec. 9, 2019, 7 pages.

Abad, Mehdi Salehi Heydar et al., "Optimal Finite Horizon Sensing for Wirelessly Powered Devices", IEEE Access, vol. 7, Sep. 25, 2019, pp. 131473-131487.

Chen, Huamin et al., "RACE: Time Series Compression with Rate Adaptivity and Error Bound for Sensor Networks", 2004 IEEE International Conference on Mobile Ad-hoc and Sensor Systems, Oct. 25, 2004, pp. 124-133.

European Search Report and Search Opinion dated Jan. 26, 2021 for corresponding European Patent Application No. EP20305923.3, 11 pages.

* cited by examiner

OPTIMIZATION OF FILES COMPRESSION

FIELD OF INVENTION

The present invention generally relates to computer systems and methods, and more particularly relates to applications that handle large amounts of data resulting from different Internet of Things applications in industrial machines.

BACKGROUND

The Internet of Things (IoT) is an essential element of the digital development of companies. On many markets, connected objects capture valuable information. Industrial IoTs are mainly sensors linked to machines that are located in different industrial sites and measure, record, and send operating data to a data center to be analyzed. To that end, a gateway, like an IoT box, collects these data from the data center under the form of files and sends the files to the cloud where the data will be stored and analyzed.

The files are compressed into a compressed file by a compression application before being sent to the cloud. The size of the compressed file must be less than a threshold, for example one Megabyte, and the compressed file must be sent regularly, for example every ten minutes. However, if the constraint of sending regularly data under a predefined size is respected, the size of data transit is not optimized as it can be more or less close to the predefined size.

There is therefore a need for improving the selection of files to send regularly such as the compressed size of the files is as close as possible to a predefined threshold.

SUMMARY

This summary is provided to introduce concepts related to the present inventive subject matter. This summary is not intended to identify essential features of the claimed subject matter nor is it intended for use in determining or limiting the scope of the claimed subject matter.

In one implementation, there is provided a method for optimizing the scheduling of files to be sent to an application server at regular time intervals, comprising the following steps in a control device:

retrieving a first set of files from a database for a time interval, the first set of files being stored in a priority queue and carrying information sent from sensors linked to industrial machines, applying the retrieved first set of files to a scheduling algorithm using a compression ratio and combined with a reinforcement learning in order to select a second set of files, compressing the second set of files based on the compression ratio into a compressed file, wherein the size of the compressed file is below a size limit, sending the compressed file to the application server, wherein the compression ratio is updated based on the size of the second set of files and the size of the compressed file, wherein the reinforcement learning uses the size of a previous compressed file from a previous time interval.

Advantageously, the method optimizes the number of bytes sent to the cloud per unit of time and reduces the cloud cost (as frames length are optimized). The reinforcement learning is light to implement, in term of consumption of memory and processing. Moreover, the reinforcement learning is fast in execution and does not need a learning phase.

Advantageously, if the compression algorithm is replaced by another one, the reinforcement learning will still be adapted to the other compression algorithm. If the files do not need to be compressed anymore, the ratio of compression will converge to value "1". If the threshold for transmission changes for a new threshold, the reinforcement learning will also converge to reach the new threshold automatically.

In an embodiment, the updated compression ratio is used for a next first set of files to be retrieved for a next time interval.

In an embodiment, the scheduling algorithm takes as input the first set of files, the compression ratio and the size limit and provides as output the second set of files, wherein the size of the second set of files divided by the compression ratio is less than the size limit.

In an embodiment, the scheduling algorithm is based on a Johnson scheduling algorithm.

In an embodiment, the reinforcement learning is based on a multi-armed bandits model.

In an embodiment, the scheduling algorithm provides an intermediary set of files that is used by a set of arms that use more or less files than the intermediary set of files and one arm is selected according to Upper Confidence Bound and corresponds to the second set of files.

In an embodiment, the sum of the weights of files of the intermediary set of files divided by the compression ratio is under the size limit.

In an embodiment, a learning phase is used for the set of arms, taking as feedback the size of the previous compressed file sent to the application server.

In another implementation, there is provided a device for optimizing the scheduling of files to be sent to an application server at regular time intervals, the device comprising:

means for retrieving a first set of files from a database for a time interval, the first set of files being stored in a priority queue and carrying information sent from sensors linked to industrial machines, means for applying the retrieved first set of files to a scheduling algorithm using a compression ratio and combined with a reinforcement learning in order to select a second set of files, means for compressing the second set of files based on the compression ratio into a compressed file, wherein the size of the compressed file is below a size limit, means for sending the compressed file to the application server, wherein the compression ratio is updated based on the size of the second set of files and the size of the compressed file, wherein the reinforcement learning uses the size of a previous compressed file from a previous time interval.

In another implementation, there is provided an apparatus for optimizing the scheduling of files to be sent to an application server at regular time intervals, the apparatus comprising:

one or more network interfaces to communicate with a telecommunication network;

a processor coupled to the network interfaces and configured to execute one or more processes; and a memory configured to store a process executable by the processor, the process when executed operable to:

retrieve a first set of files from a database for a time interval, the first set of files being stored in a priority queue and carrying information sent from sensors linked to industrial machines, apply the retrieved first set of files to a scheduling algorithm using a compression ratio and combined with a reinforcement learning in order to select a second set of files, compress the second set of files based on the compression ratio into a compressed file, wherein the size of the compressed file is below a size limit, send the compressed file to the application server, wherein the compression ratio is updated based on the size of the second set of files and the size of the compressed file, wherein the reinforcement learning uses the size of a previous compressed file from a previous time interval.

In another implementation there is provided a computer-readable medium having embodied thereon a computer program for executing a method for optimizing the scheduling of files to be sent to an application server at regular time intervals. Said computer program comprises instructions which carry out steps according to the method according to the invention.

BRIEF DESCRIPTION OF THE FIGURES

The detailed description is described with reference to the accompanying figures. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

The same reference number represents the same element or the same type of element on all drawings.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

DESCRIPTION OF EMBODIMENTS

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
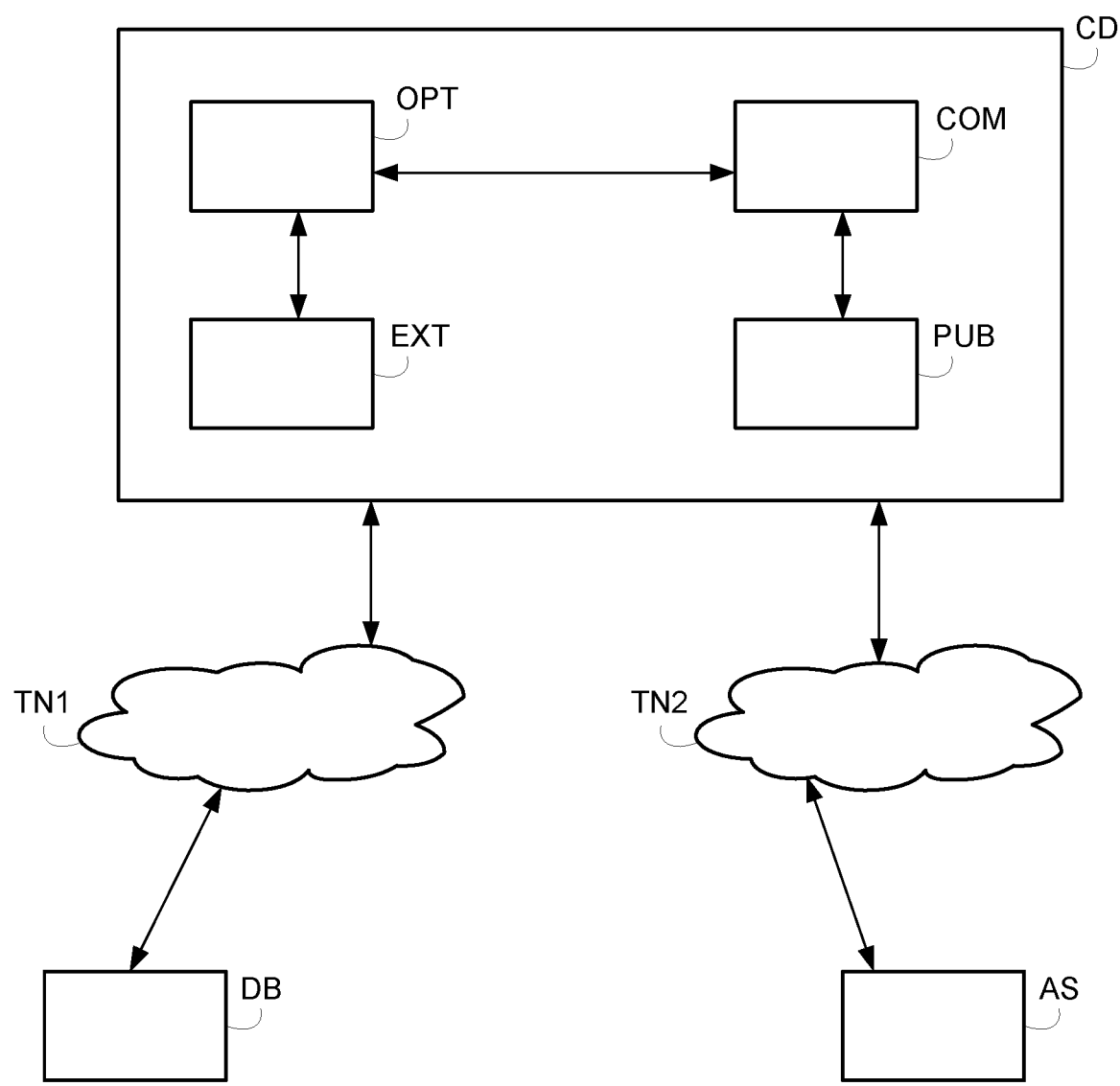
FIG. 1 shows a schematic block diagram of a communication system according to one embodiment of the invention for optimizing the scheduling of files to be sent to an application server.

Referring to FIG. 1, a control device CD can communicate with a database DB through a first telecommunication network TN1 and with an application server AS through a second telecommunication network TN2.

The first and second telecommunication networks may be a wired or wireless network, or a combination of wired and wireless networks. The first and second telecommunication networks can be associated with a packet network, for example, an IP ("Internet Protocol") high-speed network such as the Internet or an intranet, or even a company-specific private network.

The first or second telecommunication network is for example a digital cellular radio communication network of the GPRS (General Packet Radio Service), UMTS (Universal Mobile Telecommunications System), CDMA (Code Division Multiple Access) type, LTE (Long Term Evolution) or even 5G (Fifth Generation) type. Furthermore, the wireless telecommunication network TN can be accessed by the mobile device via a wireless link, such as a Wi-Fi network or Bluetooth connection.

In another example, the first or second telecommunication network is a public wireless network of limited scope, such as WLAN (Wireless Local Area Network) or conforming to a standard 802.1x, or medium range according to the protocol WiMAX (World Wide Interoperability Microwave Access).

Additionally, the first or second telecommunication network may be operating in accordance with fourth or fifth generation wireless communication protocols and/or the like as well as similar wireless communication protocols that may be developed in the future.

The database DB stores data resulting from different Internet of Things applications in industrial machines. The Internet of Things applications are implemented in sensors linked to industrial machines and measure, record, and send operating data related to the industrial machines to source databases, such as an Influxdb database for telemetry data or a sqlite database for jsonstream data.

The database DB extracts data from the source databases under the form of files, like JSON files and stores the files in a priority queue. The priority queue has the following properties: every file has a priority associated with it, a file with high priority is dequeued before a file with low priority, and if two files have the same priority, they are server according to their order in the queue (like in First In First Out scheme). It is assumed that a file contains a set of data coming from one source database and related to one industrial machine for example. The set of data include coherent data that are intended to be filtered and consumed by external applications or client users of industrial machines.

The application server AS is a server able to analyse the content of data from the databases DB. To that end, the application server can decompress files that are received from the control device and that contain such data. The analysed content may serve the operator of industrial machines for delivering or improving different kind of services related to the industrial machines.

The control device CD includes a collector module COL, an optimizer module OPT, a compression module COM and a publication module PUB.

The control device CD is operated to retrieve files from the database DB and to send selected files to the application server AS with the following constraints:

selected files are sent under the form of a compressed file which size must be under a predefined threshold (for example 1 Megabyte), selected files must be sent regularly (for example every 10 minutes).

It has to be considered that the compression algorithm is not additive, meaning that the size of a compressed file of a first file and a second file is different from the sum of the size of compressed first file and of the size of the compressed second file.

The extractor module EXT extracts data as files from the database, the files being stored in a priority queue. Initially, all files are enqueued with a priority p with p=0. When files are selected by the optimizer module to be sent to the application server, the remaining files in the priority queue have a priority incremented by 1.

The optimizer module OPT applies a job shop scheduler to schedule and order files to send to the application server and further applies a reinforcement learning to the job shop scheduler to better select the size of the files to send to the application server.

The compression module COM compresses selected files by the optimizer module OPT with a determined ratio. The files may be transformed in a predefined format adapted for publication to the application server.

The publication module PUB is configured to send the compressed files to the application server AS through the second telecommunication network TN2.

More precisely, the optimizer module OPT executes a scheduling algorithm using a compression ratio combined with a reinforcement learning to select a set of files for compression and to update the compression ratio. One constraint of the scheduling algorithm is that the selected set of files should have a weight as close as possible to a predefined threshold. For example, this threshold is imposed by the limit of bandwidth allocated to the reporting service performed by the control device via the second telecommunication network TN2.

In one embodiment, the optimizer module OPT executes a Johnson scheduling that consists in selecting files with a constraint related to a size limit and taking into account the priority and the size of files.

The scheduling algorithm takes in input a first set of files $F=\{f_0, \ldots, f_n\}$ retrieved from the priority queue, a sort criteria C (per priority p of files and size ω of file), the number N of files, a size limit L, a compression ratio and provides in output a second set of files $B=\{f_j, \ldots, f_k\}$ with B F, under the formed of the set T (including sorted second set of files), and a set of remaining files F' (with $F' \subset F$) including files remaining in the priority queue.

The scheduling algorithm may be defined as the following:

```
N ← NumberOfItem(F)
T = Sort(F , C)
B ← 0, sizeB ← 0, i ← 0
while (sizeB < (L − ε)) and (i < N) do
B_i ← T[i]
```

$$sizeB \leftarrow \frac{\sum_{i=1}^{|B|} B[i] \cdot \omega}{R}$$

```
return B, T
F' = F − B : files not selected for the publication
for all remaining files increase the priority p by 1
i ← 0
N ← NumberOfItem(F')
while (i < N) do F'[i].p ← F'[i].p + 1
return F'.
```

The precision of the scheduling algorithm depends on the compression ratio that is estimated (the estimated ratio is the ratio used to compress the last files sent to the application server). If the ratio is better estimated, the batch size to send to the application server is thus optimized. To that end, a reinforcement learning is used to better estimate the ratio.

In one embodiment, the reinforcement learning is based on the Multi Armed Bandits Algorithm (MAB). In the MAB model, a decision maker repeatedly chooses among a finite set of actions. At each step t, a chosen action "a" yields a reward drawn from a probability distribution intrinsic to action "a" and unknown to the decision maker. The goal for the latter is to learn, as fast as possible, which are the actions yielding maximum reward in expectation. Multiple algorithms have been proposed within this framework. As explained hereinafter, a policy based on Upper Confidence Bounds (UCBs) has been shown to achieve optimal asymptotic performances in terms of the number of steps t.

The Multi Armed Bandits can be seen as a set of real distributions $B=\{R_1, \ldots, R_k\}$, each distribution being associated with the rewards delivered by one of the K e N+ levers. Let $\mu_1, \ldots, \mu_k$ be the mean values associated with these reward distributions.

The gambler iteratively plays one lever per round and observes the associated reward. The objective is to maximize the sum of the collected rewards. The horizon is the number of rounds that remain to be played. The bandit problem is formally equivalent to a one-state Markov decision process.

The regret p after T rounds is defined as the expected difference between the reward sum associated with an optimal strategy and the sum of the collected rewards:

$$\rho = T\mu^* - \Sigma_{t=1}^{T}(r_t)$$

where μ* is the maximal reward mean, $$\mu^* = \max_k \{\mu_k\},$$

and $r_t$ the reward in round t.

A "zero regret strategy" is a strategy whose average regret per round ρ/T tends to zero with probability equal to "1" when the number of played rounds tends to infinity. Zero regret strategies are guaranteed to converged to an optimal strategy if enough rounds are played. Some strategies exist which provide a solution to the bandit problem.

In one embodiment, the Upper Confidence Bound algorithm is selected to provide a quick convergence to an optimal ratio with accuracy.

In the Upper Confidence Bound algorithm, the means of each arm are defined by $$X_j = \left(\frac{1}{T_j}\right) \sum_{i=1}^{t} r_i \chi_{j=i}$$

where t denotes the number of tries, Tj denotes the number of tries per arm j, $r_t$ denotes the reward for the try i;
where χ is a function indicating that the machine j has been selected for the try i.

To calculate the index in each channel, a bias is introduced to allow the algorithm to explore the different machines:

$$B_j = X_j + A_j$$

The bias must be chosen to have a logarithmic decrease of the regret (the regret is logarithmically bounded):

$$A_j = \sqrt{2\log(t)/T_j}$$

The arm chosen is the one maximizing the sum of the two terms $X_j$ and $A_j$.

An embodiment comprises a control device CD under the form of an apparatus comprising one or more processor(s), I/O interface(s), and a memory coupled to the processor(s). The processor(s) may be implemented as one or more microprocessors, microcomputers, microcontrollers, digital signal processors, central processing units, state machines, logic circuitries, and/or any devices that manipulate signals based on operational instructions. The processor(s) can be a single processing unit or a number of units, all of which could also include multiple computing units. Among other capabilities, the processor(s) are configured to fetch and execute computer-readable instructions stored in the memory.

The functions realized by the processor may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included.

The memory may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory includes modules and data. The modules include routines, programs, objects, components, data structures, etc., which perform particular tasks or implement particular abstract data types. The data, amongst other things, serves as a repository for storing data processed, received, and generated by one or more of the modules.

A person skilled in the art will readily recognize that steps of the methods, presented above, can be performed by programmed computers. Herein, some embodiments are also intended to cover program storage devices, for example, digital data storage media, which are machine or computer readable and encode machine-executable or computer-executable programs of instructions, where said instructions perform some or all of the steps of the described method. The program storage devices may be, for example, digital memories, magnetic storage media, such as a magnetic disks and magnetic tapes, hard drives, or optically readable digital data storage media.

Figure 2:
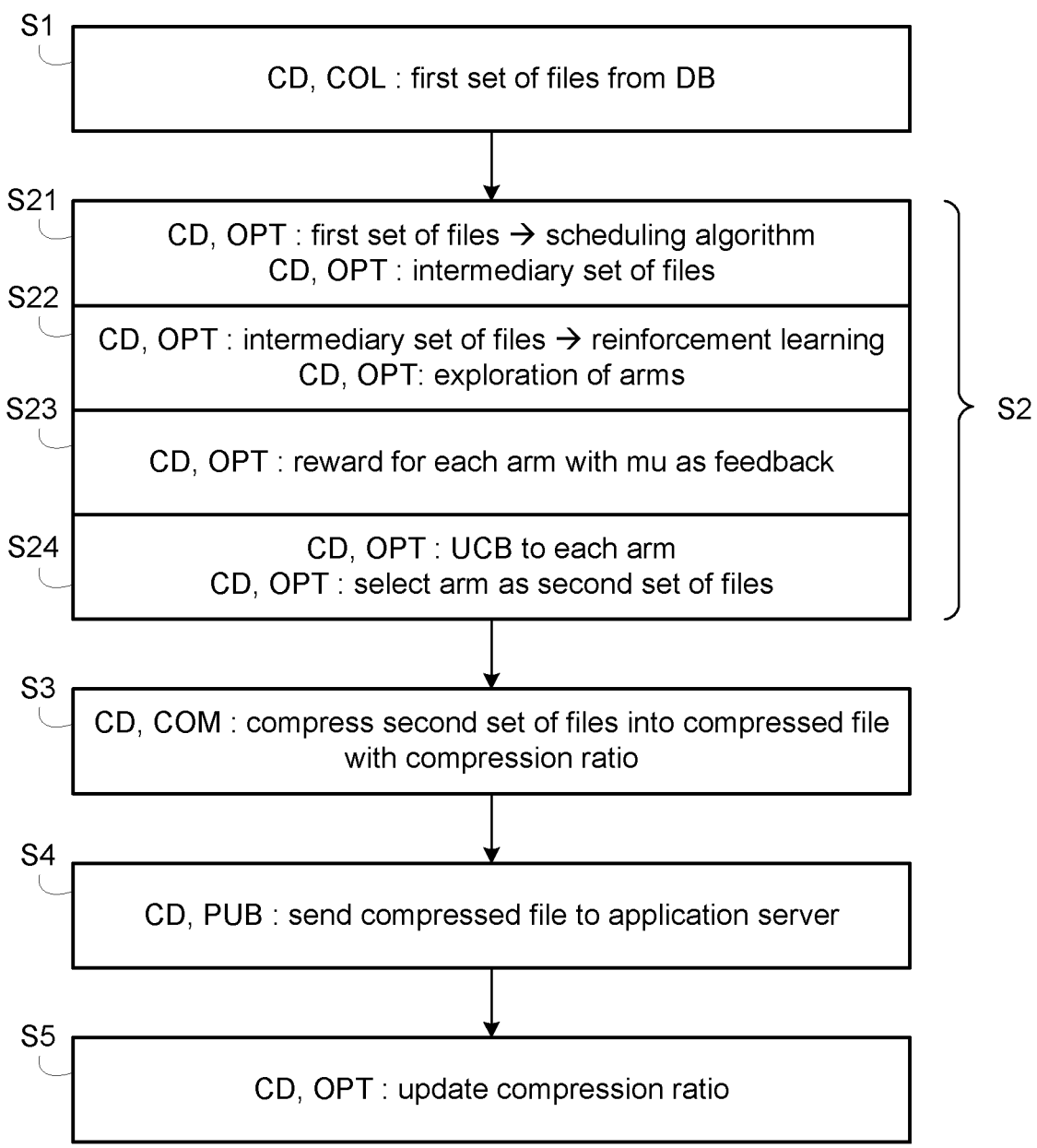
FIG. 2 shows a flow chart illustrating a method for optimizing the scheduling of files to be sent to an application server according to one embodiment of the invention.

With reference to FIG. 2, a method for optimizing the scheduling of files to be sent to an application server according to one embodiment of the invention comprises steps S1 to S5.

In step S1, the collector module COL of the control device CD retrieves files from the database DB through the first telecommunication network TN1. The files are stored in the queue with a priority p with p=0. When files are not selected to be sent to the application server, these files become remaining files in the priority queue and have an updated priority incremented by 1. The collector module COL thus retrieves a first set of files among all the files currently stored in the priority queue.

The collector module retrieves a set of files regularly according to a publication period, for example every ten minutes, in order to send at least a part of this set of files to the application server. Said at least a part of this set of files will be removed from the priority queue that will be also feed by other files coming from the source databases for a next publication period.

In step S2, the optimizer module OPT applies the first set of files to a scheduling algorithm combined with a reinforcement learning, for example the Johnson scheduling combined with the multi armed bandits model, according to sub-steps S21 to S24 explained in more details hereinafter. Especially the scheduling algorithm combined with the reinforcement learning takes as input that can change according to the publication period, the first set of files, the compression ratio and the number of arm, and provides as output a second set of files intended to be sent to the application server and an updated compression ratio that will be used for the next publication period.

In step S21, the optimizer module OPT execute the scheduling algorithm that takes in input the first set of files $F=\{f_0, \ldots, f_n\}$ retrieved f from the priority queue, a size limit L, a compression ratio Rt−1 and provides in output an intermediary set of files $B=\{f_0, \ldots, f_k\}$ with $B \subset F$. For example, the Johnson scheduling is applied to the first set of files and selects an intermediary set of files among the first set of files by satisfying the following criteria: the sum of the weights of files of the intermediary set of files divided by the compression ratio is under the size limit L In step S22, the optimizer module OPT executes the reinforcement learning on the intermediary set of files. For example, the reinforcement learning is based on the multi armed bandits model using N arms, with an odd number N>3. The intermediary set of files $B=\{f_0, \ldots, f_k\}$ corresponds to an arm arm[0] with index "0". Each arm corresponds to the intermediary set of files with more or less files. For example the arm arm[−1] corresponds to the intermediary set of files B without one file among the files $f_0, \ldots, f_k$.

The reinforcement learning is done by exploration by reduction or by augmentation of the intermediary set of files B.

In exploration by reduction, arm[−i] corresponds to the intermediary set of files B without the i last files:

$$\forall i \in \left[1 \ldots \frac{N}{2}\right] \operatorname{arm}[-i] = \{f_0, \ldots, f_{k-i}\}$$

In exploration by augmentation, arm[+i] corresponds to the intermediary set of files B plus next i files:

$$\forall i \in \left[1 \ldots \frac{N}{2}\right] \operatorname{arm}[+i] = \{f_0, \ldots, f_{k+i}\}$$

In step S23, the optimizer module OPT uses a learning phase for the different arms, taking as feedback the size Ω of the last compressed file sent to the application server during the last publication period. Each arm receives a reward μ according to the formula:

$$\forall i \in [0 \ldots N] \mu_i = arm[i] \cdot weight/\Omega$$

wherein $\mu_i$ is the reward for arm[i]
wherein $$\forall k \in \left[-\frac{N}{2} \ldots \frac{N}{2}\right] arm[k] \cdot weight = \sum_{i=0}^{k} sizeof(f_i)$$

The reward for a given arm can be seen as the estimated weight of a compressed file based on the files corresponding to the intermediary set of files used by the given arm. An arm can be penalized if said the estimated weight is above the size limit.

In step S24, the Upper Confidence Bound algorithm is selected and applied to each arm. The optimizer module OPT selects the arm[i] that provides the best reward among the rewards of the arms, according to the formula:

$$\forall i \in [1 \ldots N] B_j = X_j + A_j$$

$$arm - selected = \max_j (B_j)$$

In step S3, the optimizer module OPT has selected an arm that contains a second set of files corresponding to the intermediate set of files with more or less files and provides the second set of files to the compression module COM.

The compression module COM compresses the second set of files with the compression ratio into a compressed file, the compressed file being intended to be sent to the application server and having a size $\Omega$ with a new value compared to the value of the size of the last compressed file sent to the application server during the last publication period.

In step S4, the publication module COM retrieves the compressed file, optionally adapts it with respect to the protocol used for publication. The publication module COM sends the compressed file to the application server through the second telecommunication network.

In step S5 that can take place before or in parallel to step S4, the optimizer module OPT has selected an arm that contains a second set of files containing the files $\{f_0, \ldots, f_m\}$. The optimizer module OPT updates the compression ratio based on the size of the compressed file and the size of the files of the second set of files. The updated compression ratio can determined according to the following relation:

$$R_t = \frac{R_{t-1} + \omega/\Omega}{2}$$

wherein $\Omega$ is the size of the compressed file to be sent to the application server
wherein $\omega$ is the size of the files of the second set of files
$\omega = \sum_{j=0}^{m}$ size of $(f_j)$ For the next period of publication, steps S1 to S5 are reiterated for a new first set of files, the optimizer module taking as input the updated compression ratio for the scheduling algorithm and the size of the compressed file for the reinforcement learning.

Although the present invention has been described above with reference to specific embodiments, it is not intended to be limited to the specific form set forth herein. Rather, the invention is limited only by the accompanying claims and, other embodiments than the specific above are equally possible within the scope of these appended claims.

Furthermore, although exemplary embodiments have been described above in some exemplary combination of components and/or functions, it should be appreciated that, alternative embodiments may be provided by different combinations of members and/or functions without departing from the scope of the present disclosure. In addition, it is specifically contemplated that a particular feature described, either individually or as part of an embodiment, can be combined with other individually described features, or parts of other embodiments

The invention claimed is:

1. A method, performed in a control device, for optimizing the scheduling of files that were compressed to be sent to an application server at regular time intervals for decompression, comprising:
  retrieving a first set of files from a database for a time interval, the first set of files being sorted by priority and stored in a priority queue and carrying information sent from sensors linked to industrial machines,
  applying a scheduling algorithm combined with a reinforcement learning to the sorted first set of files in order to select a second set of files from the sorted first set of files based on a compression ratio that was updated in a previous time interval, the second set of files being selected for a size of the second set of files to satisfy a size limit provided for the current time interval,
  compressing the second set of files based on the compression ratio into a compressed file,
  sending the compressed file to the application server, and
  updating the compression ratio based on the size of the second set of files and the size of the compressed file for use with a next time interval.

2. The method according to claim 1, wherein the updated compression ratio is used for a next first set of files to be retrieved for a next time interval.

3. The method according to claim 1, wherein the scheduling algorithm takes as input the first set of files, the compression ratio and the size limit and provides as output the second set of files, and wherein the size of the second set of files divided by the compression ratio is less than the size limit.

4. The method according to claim 1, wherein the scheduling algorithm is based on a Johnson scheduling, algorithm.

5. The method according to claim 4, wherein the reinforcement learning is based on a multi-armed bandits model.

6. The method according to claim 5, wherein the scheduling algorithm provides an intermediary set of files that is used by a set of arms that use more or less files than the intermediary set of files and one arm is selected according to Upper Confidence Bound and corresponds to the second set of files.

7. The method according to claim 6, wherein the sum of the weights of files of the intermediary set of files divided by the compression ratio is under the size limit.

8. The method according to claim 6, wherein a learning phase is used for the set of arms, taking as feedback the size of the previous compressed file sent to the application server.

9. A control device for optimizing the scheduling of files that were compressed to be sent to an application server at regular time intervals for decompression, the device comprising:
  means for retrieving a first set of files from a database for a time interval, the first set of files being sorted by priority and stored in a priority queue and carrying information sent from sensors linked to industrial machines, means for applying a scheduling algorithm combined with a reinforcement learning to the sorted first set of files in order to select a second set of files from the sorted first set of files based on a compression ratio that was updated in a previous time interval, the second set of files being selected for a size of the second set of files to satisfy a size limit provided for the current time interval, means for compressing the second set of files based on the compression ratio into a compressed file, means for sending the compressed file to the application server, wherein the compression ratio based on the size of the second set of files and the size of the compressed file for use with a next time interval.

10. A non-transitory computer-readable medium having embodied thereon a computer program for executing a method for optimizing the scheduling of files to be sent to an application server at regular time intervals on a control device according to claim 1.

11. An apparatus for optimizing the scheduling of files that were decompressed to be sent to an application server for decompression at regular time intervals, the apparatus comprising:

one or more network interfaces to communicate with a telecommunication network;

a processor coupled to the network interfaces and configured to execute one or more processes; and a memory configured to store a process executable by the processor, the process when executed operable to:

retrieve a first set of files from a database for a time interval, the first set of files being sorted by priority and stored in a priority queue and carrying information sent from sensors linked to industrial machines, apply a scheduling algorithm combined with a reinforcement learning to the sorted first set of files in order to select a second set of files from the sorted first set of files based on a compression ratio that was updated in a previous time interval, the second set of files being selected for a size of the second set of files to satisfy a size limit provided for the current time interval, compress the second set of files based on the compression ratio into a compressed file, send the compressed file to the application server, update the compression ratio based on the size of the second set of files and the size of the compressed file for use with a next time interval.

* * * * *